Patented July 21, 1925.

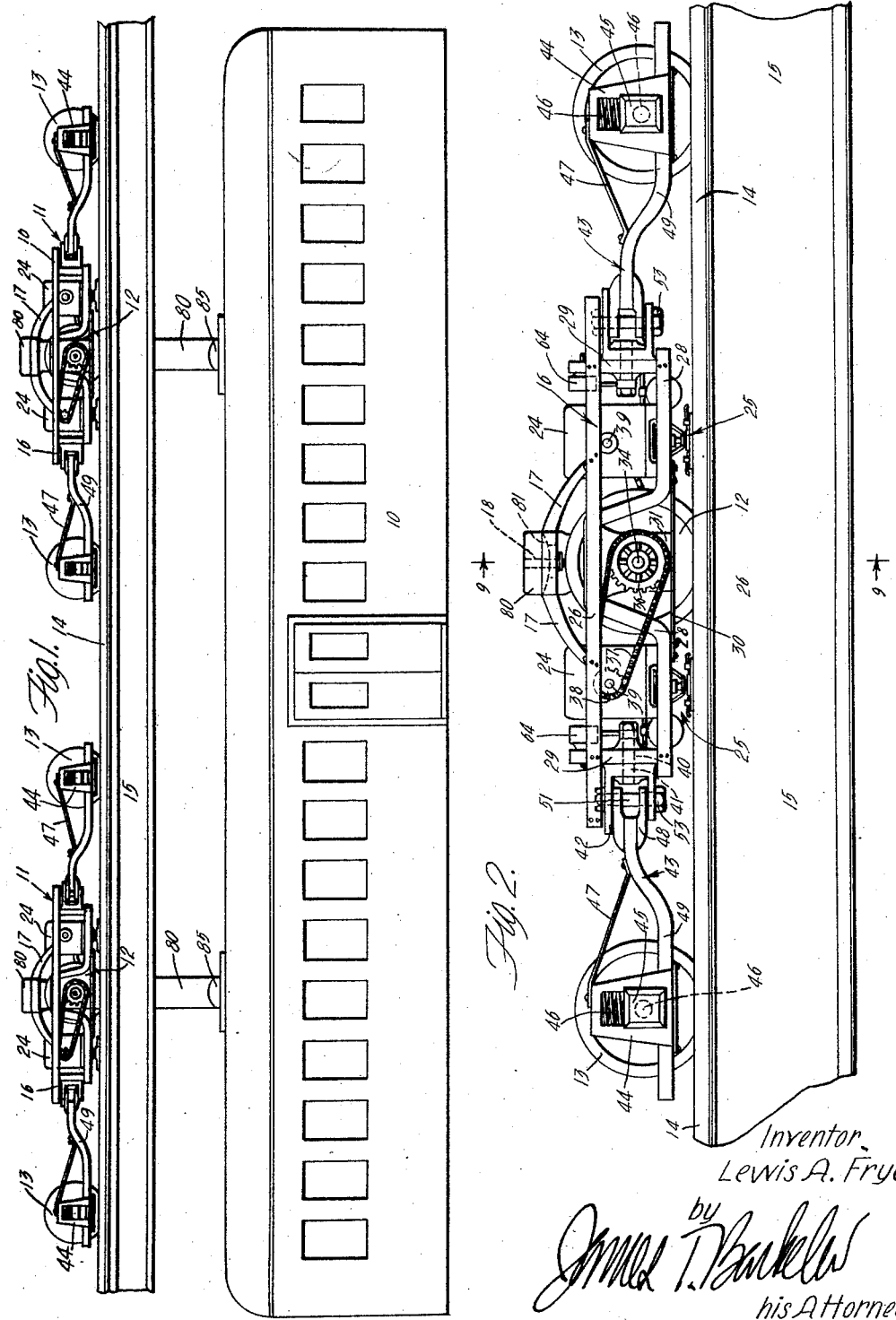

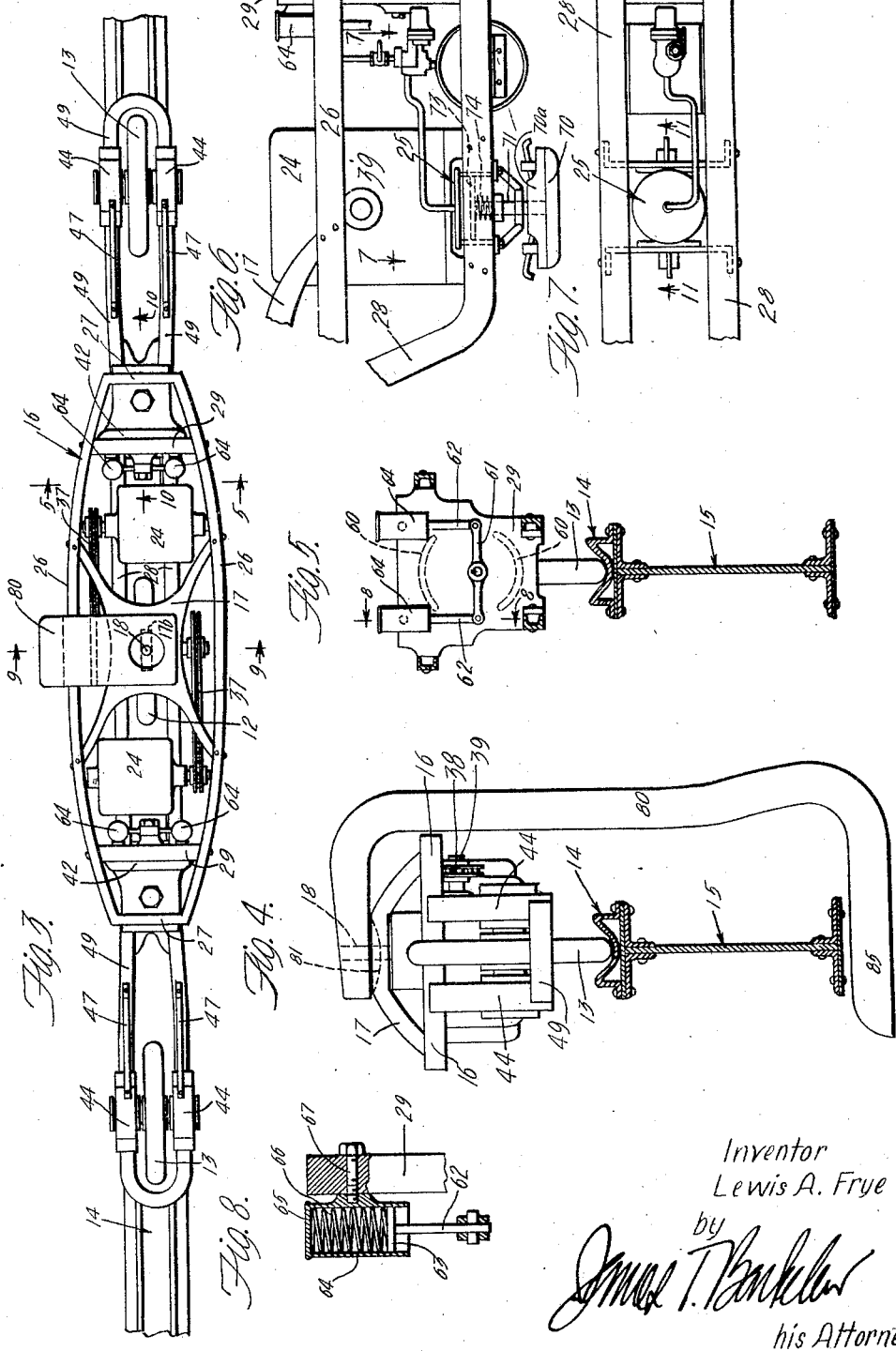

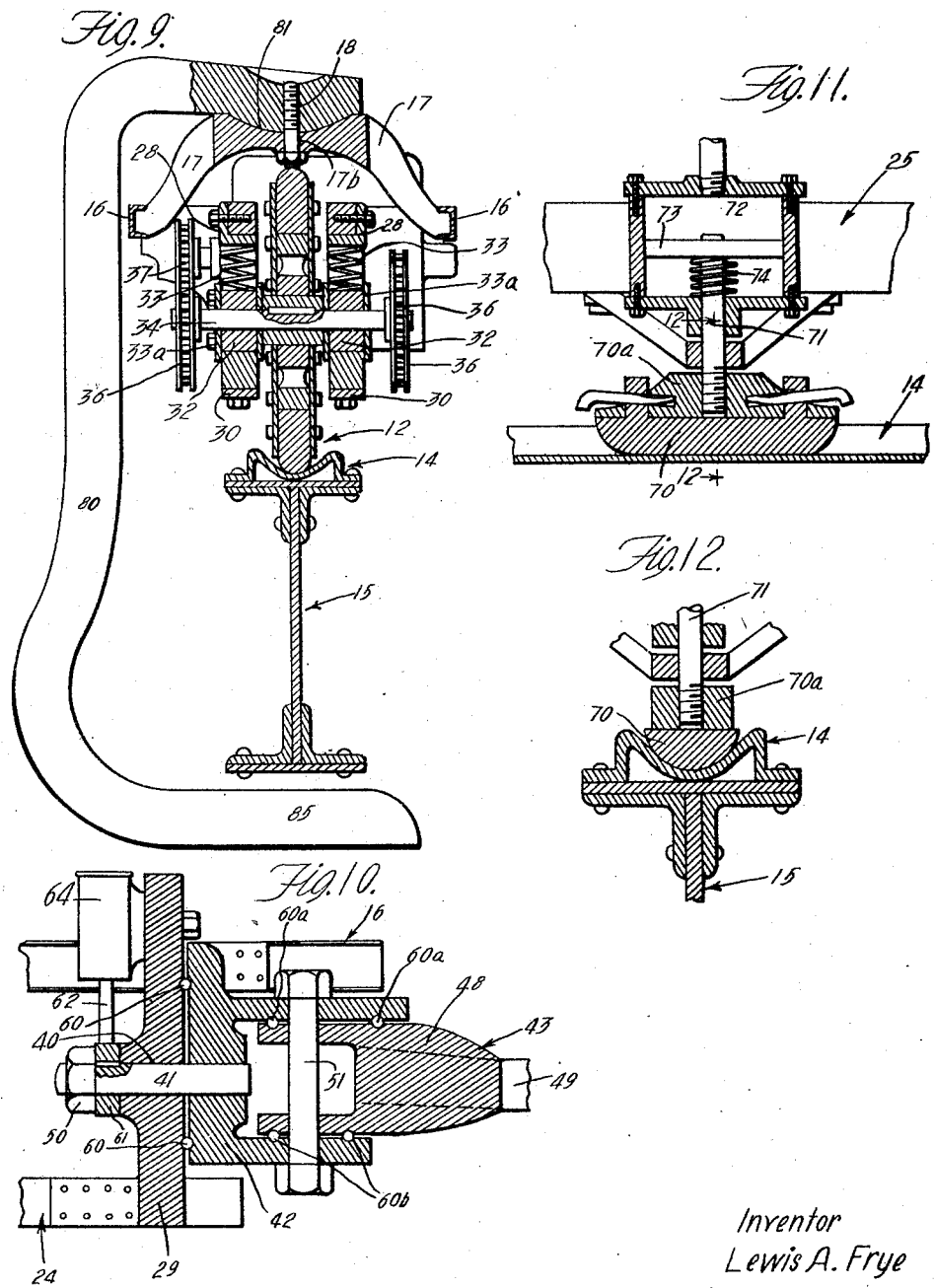

1,546,925

UNITED STATES PATENT OFFICE.

LEWIS A. FRYE, OF LOS ANGELES, CALIFORNIA.

TRUCK FOR SUSPENDED MONORAIL SYSTEMS.

Application filed June 25, 1919, Serial No. 306,519. Renewed December 20, 1923.

*To all whom it may concern:*

Be it known that I, LEWIS A. FRYE, a citizen of the United States, residing at Los Angeles, in the county of Los Angeles, State of California, have invented new and useful Improvements in Trucks for Suspended Monorail Systems, of which the following is a specification.

The present invention relates to trucks for suspended monorail systems and it is a primary object of the invention to provide a strong, simple and flexible truck.

By the present invention a truck is provided for cars used on suspended mono-rail systems which will distribute the weight of the car over a length of rail approximately equal to the length of the car. It will be understood that the invention is not necessarily limited to such systems, being applicable to any mono-rail system; but it is particularly efficient in such a system where the weight is widely distributed and where the truck may be correspondingly long. This distribution of the weight to be carried by the rail makes it possible to make the rail much lighter than would be necessary if the weight of the car was concentrated in one or two places. The weight of the car being distributed over the rail and the rail being made comparatively light allows the supports for said rail to be made light also. The rail and the supports being lighter than the rails and supports commonly used in suspended mono-rail systems makes the cost of track construction comparatively cheap.

A particular feature of the truck is its flexibility, which allows it to make short curves although its wheel base may be very long. The truck is constructed so that the weight of the car is carried by several wheels which are spaced considerable distances apart while at the same time it is made flexible so as to allow the wheels to stay in or on the rail when going around a sharp curve. When the truck is on a curve the wheels not only follow the rail but may tilt slightly so as to keep in proper contact with the rail. The fact that the wheels may tilt from side to side also allows the truck to balance or center itself when running on a straight track. A further feature of the invention is the smoothness with which the truck runs on the track. The wheel base of the truck being long and the flexibility of the truck which allows the wheels to properly engage the track, cause the truck to run over small bumps or uneven places in the track without jarring.

Further features of the invention as well as the structural details of the invention will be clearly understood from the following detailed description of a specific preferred form of the invention in which reference is had to the accompanying drawings, in which—

Fig. 1 is a side elevation showing a car carried by two trucks; Fig. 2 is an enlarged side elevation of a truck; Fig. 3 is a plan of the truck shown in Fig. 2; Fig. 4 is an end elevation of the truck showing it in connection with the rail; Fig. 5 is a detail section taken as indicated by line 5—5 on Fig. 3; Fig. 6 is an enlarged detailed view showing the brake mechanism; Fig. 7 is an enlarged detail section taken as indicated by line 7—7 on Fig. 6; Fig. 8 is an enlarged section taken as indicated by line 8—8 on Fig. 5; Fig. 9 is an enlarged cross section taken on line 9—9 of Figs. 2 and 3; Fig. 10 is an enlarged detail section taken on line 10—10 of Fig. 3; Fig. 11 is an enlarged detail section taken on line 11—11 of Fig. 7; and Fig. 12 is a sectional view taken as indicated by line 12—12 on Fig. 11.

In the drawings numeral 10 designates a car which is carried by two trucks 11. Each truck 11 comprises a driving wheel 12 and two pilot wheels 13 all of which run in a rail 14. The rail 14 has a concave tread which forms a groove or channel, as shown in Figs. 4, 5 and 9. The rail 14 is mounted on a built up beam 15, which may be supported in any suitable manner. As shown in Fig. 1, the wheels 12 and 13 are carried in truck frames 11 so that the wheels are equally spaced. This construction distributes the load of the car over six evenly spaced points rather than concentrating it at the ends of the car. By thus distributing the weight of the car the beam 15 may be made much lighter than it could if the weight were concentrated at the ends of the car. Each truck has a main frame 16 which carries the drive wheel 12, the motors 24 and the brakes 25. The main frame comprises an upper frame and a lower frame. The upper frame has sides 26 and ends 27. The sides 26 are curved out so as to make the frame wider at the center than at the ends. The lower frame comprises two side members 28 which extend between the lower corners of transverse plates 29. The side members 28 are parallel with each other and are shaped so as to have a high portion midway between the plates 29, which is level with the upper frame. Attached to the bottom of sides 28 are brace bars 30 which extend across the open space formed by side members 28, being shaped as just described.

Extending between the raised portions of the side members 28 and the braces 30 are frames 31 in which are carried bearing blocks 32. Bearing blocks 32 have side plates 33ª which keep them in position in frame 31. The shaft 34 on which driving wheel 12 is mounted is carried in the bearing blocks 32. The load to be carried by the wheel 12 is transmitted to the blocks 32 through springs 33 which extend between the blocks 32 and the frame 28.

The shaft 34 extends through blocks 32 and mounted on the ends of the shaft are sprockets 36 which are driven by means of chains 37 from sprockets 38 mounted on motor shafts 39. There is preferably a motor 24 mounted on each end of the lower frame, equally distant from the central driving wheel; so that the truck structure is balanced in arrangement. The motors 24 are so arranged that one motor drives the sprocket 36 mounted on one end of shaft 34 while the other motor drives the sprocket mounted on the other end of shaft 34.

The transverse plates 29 are perpendicular and connect the ends of the lower frame with the upper frame. The upper frame is longer than the lower frame and extends a little beyond the plates 29. There is a hole 40 in each plate 29 through which a stud 41 extends. The studs 41 carry yokes 42 which are thus rotatable about the horizontal axis of the stud. The pins 41 extend through plates 29 and are prevented from pulling out of holes 40 by nuts 50. Vertical pivot pins 51 in yokes 42 carry frames 43, which carry the pilot wheels 13. These frames thus have a tilting motion of adjustment about the axis of studs 41, and also a swinging motion in a plane normally horizontal but tilted from horizontal when the frame tilts around the axis of stud 41. The frames 43 extend outward from the yokes 42 and are shaped so that their ends are lower than the yoke 42, as shown in Fig. 2. Mounted on the ends of frames 43 are frames 44 in which are carried bearing blocks 45. The bearing blocks 45 carry the axles 46 of pilot wheels 13. The construction and mounting of pilot wheels is substantially the same as that of drive wheels 12. Between bearing blocks 45 and the top of the frames 44 there are springs 46 which transmit the load from the frame to the bearing blocks. Extending from the tops of frames 44 to the frames 43 near the yokes 42 are brace rods 47. The frames 43 comprise blocks 48 which are pivotally connected to the yokes and members 49 which are U-shaped, as shown in Fig. 3. The blocks 48 are pivotally connected to the yokes 42 by means of pins 51 which extend through the yokes and the blocks. The pins 51 are prevented from pulling out of the yokes and the blocks by means of nuts 53.

Between the yokes 42 and the plates 29 there are ball bearings 60 which separate the two members and prevent them from binding; and between block 48 and the upper and lower sides of yoke 42 there are ball bearings 60ª and 60ᵇ. The bearing at 60ª may be somewhat advanced forwardly of the pin 51 to well take the upward thrust of the frame 43.

Keyed on studs 41 between the plates 29 and the nuts 50 are rocker arms 61 to the ends of which are pivotally connected connecting rods 62. The connecting rods 62 have mounted on their ends plungers 63 which are carried in cylinders 64. Within the cylinder 64 between the plungers 63 and the cylinder heads 65 are compression springs 66. The cylinders 64 are pivotally mounted on plates 29 by means of pins 67. When for any reason the pilot wheels have a tendency to tilt, for instance, when the truck is on a curve, the pivotal mounting of the yokes will allow the wheels to tilt. When the pilot wheels 13 tilt, one of the compression springs 66 will be compressed and tend to return the wheel to its normal position. The springs 66 act as an equalizer and tend at all times to keep the wheels in their normal position. The frames 43 being pivotally connected to the main frame 16 allows the pilot wheels to follow a curve in the track and the pivotal mounting of the yoke on the plates 29 allows the wheels to tilt sufficiently to properly center themselves in the rails. This will be fully explained.

Before proceeding to a detailed explanation of the mode of operation of my improved form of truck, I will first go on to draw attention to certain details of construction and arrangement which may be used in my truck. Of course it will be understood that the truck may be provided with suitable brakes and all other such appurtenances as are usually put upon railway trucks. For instance, I have shown a brake shoe at 70 keyed to a block 70ª which is mounted upon the lower end of a piston rod 71, this piston rod being pushed downwardly by air pressure in a cylinder 72 above a piston 73, a spring 74 normally raising the brake shoe off the track. The ordinary and usual triple valve control may be used for this brake operation.

For suspending the car from the truck which I have described I utilize, for each truck, a suspension bracket whose upper end extends over a spider 17 and has a spherical bearing at 81 upon the center of the supporting spider. This spider 17 will be seen from the drawings to be a four-point construction having connection with the main frame at four points and carrying the bracket 80 at its center. A heavy stud 18 extends from bracket 80 through a slot 17$^b$ in frame 17 to keep the bracket in position on the spider. The slot 17$^b$ is parallel with the truck and allows the truck and the bracket to move relative to each other when the truck passes over uneven places in the track. The connection between the bracket 80 and the frame 17 may be made rigid in which case the springs 33 and 46 will prevent uneven running of the wheels from causing jarring of the car. Bracket 80 has a lower part 85 which extends under the rail beam 15; and the car 10 is carried by this part 85 in any suitable manner. It will of course be understood that the car will be so framed that its whole weight may be carried from the points where the brackets 80 attach.

I have said that one of the main objects of my invention is the provision of a truck for a mono-rail system which will give even or substantially even distribution of the weight over a plurality of wheels, and at the same time will have a sufficient flexibility to take relatively sharp curves and keep that even distribution while taking curves. There are, as has been hereinbefore set forth, many other features of my invention, but these I believe to be apparent from the foregoing specification. Accordingly I will now explain more particularly that feature of my invention which has to do with the flexible action of the truck in taking curves.

It will be readily seen without the necessity of detailed description how the frames of the two pilot wheels will swing in a horizontal plane, and how the main frames of the two trucks will also swing in a horizontal plane, with reference to the car and the supporting brackets 80, when the trucks round a curve. If it could always be insured that the car, in rounding a curve, would always hang directly in the plane of the rail, all three wheels of each truck would then of course keep in perfect contact with the rail at all times. On the curve the rails will of course be tilted up to conform to the normal or average angle to which the suspended car will swing in rounding the curve; but the car will not always take the angle for which the rail is set. Consequently, either because the car swings too far or too little from its vertical position, and because, while travelling around the curve, the three wheels of each truck are out of alignment, there will always be either a tendency to raise the two pilot wheels off the track or to raise the center driving wheel off the track. Now it will be readily understood that a tilting of the pilot wheel frames and of the pilot wheels about the horizontal axis of studs 41, tilting the pilot wheels from their normal truly vertical position, will of course raise the lower peripheries of the pilot wheels. Any action of the truck which tends to put an excess weight or pressure upon the pilot wheels (that is, any action of the truck which tends to raise the main center wheel and tends to lower the pilot wheels) will tend to cause a tilting displacement of the pilot wheel from its normal vertical position; while any action which tends to raise the pilot wheels will of course allow the pilot wheels to come back toward or to their normal central vertical positions, thereby lowering their lower peripheries and keeping them in contact with the rail surface. Thus, although the pilot wheels may swing in a horizontal plane, their lower peripheries will be kept in contact with the rail at all times, regardless of the angle which the car may assume in rounding a curve. Of course these statements are true within certain limits of action; but those limits of action may be large enough to include any ordinary swinging of the car. The action of springs 66 in cylinder 64 tends to right the pilot wheels at all times; and this tendency is strong enough, and increases with tilting displacement of the pilot wheel, so that there can be at no time any tendency to turn the pilot wheel so far as to throw it entirely out of proper tread engagement with the track.

As has been hereinabove described the wheels are mounted in the trucks so as to be equally spaced. It will be understood that the trucks may be so arranged as to cause the adjacent wheels of the two trucks to be the same distance apart as the wheels of each truck, or they may be set closer together or farther apart to suit conditions. The space between adjacent wheels of the two cars may also be made to vary to suit conditions. It will be readily understood that although the trucks may be set so as to cause the spacing of the wheels to be not exactly even the distribution of the weight of the car will be approximately even. The reason for this is the long wheel base of each truck which causes the load carried by each truck to be distributed over a considerable length of rail.

From the foregoing description of a preferred and specific form of my improved truck, it is thought that my invention will be readily understood. I have proceeded in some detail to give the particulars of my preferred form of truck, not for the purpose of limiting my invention, but for the purpose of giving a clear idea of it. I believe my invention to be broad in its scope and not limited except as specifically stated in the following claims.

Having described a preferred form of my invention, I claim:

1. A truck embodying two parts, one a main frame with wheel support the other a pilot frame with wheel support, a connecting member, means connecting the connecting member and one of said parts so that they can swing relative to each other about an axis substantially longitudinal of the truck, and means connecting the connecting member and the other part so that they can swing relative to each other only about a substantially vertical axis.

2. A truck embodying a central truck frame with wheel support, and a pilot frame at each end of the central frame, each pilot frame having a wheel support and being pivoted to the central frame to swing relative thereto about a longitudinal axis and also about a normally vertical axis, the pilot frames being connected to the central frame so that load thrust is transmitted directly from the central frame to the pilot frames.

3. A truck embodying, a main frame with wheel support, a pilot frame with wheel support, and means pivotally connecting the frames and transmitting load thrust from the main frame to the pilot frame, said means embodying a connecting member connected to the main frame to be movable relative thereto about an axis longitudinal of the truck and connected to the pilot frame to be movable relative thereto only about a normally vertical axis.

4. A truck, embodying a main truck frame with wheel support, and a pilot frame at one end of the main frame and pivoted to the main frame to swing thereon about a longitudinal axis and also about a normally vertical axis, and resilient means to keep the pilot frame and its wheel in a normal upright position.

5. A truck, embodying a central truck frame with wheel support, and a pilot frame at each end of the central frame, each pilot frame having a wheel support and being pivoted to the main frame to swing thereon about a longitudinal axis and also about a normally vertical axis, said longitudinal axis being substantially above the rail treads of the pilot wheels, and resilient means to keep each pilot frame and its wheel in a normal upright position.

6. A truck, embodying a main truck frame with wheel support, a pilot truck frame with a pilot wheel, said pilot frame being pivoted at its end to the main frame and the track tread of the pilot wheel being removed from the pivotal center; resilient means for keeping the pilot frame in normal position aligned with the main frame.

7. A truck, embodying a main truck frame with wheel support, a pilot truck frame with a pilot wheel, said pilot frame being pivoted at its end to the main frame on a horizontal axis and on a normally vertical axis so that the pilot frame and wheel may tilt about the longitudinal axis and swing about the vertical axis, the pilot wheel being longitudinally removed from the vertical axis and the longitudinal axis being substantially above the track tread of the pilot wheel; resilient means opposing the tilting movement of the pilot frame and keeping the pilot wheel normally upright.

8. A truck, embodying a main truck frame with wheel support, a pilot truck frame with a pilot wheel, said pilot frame being pivoted at its end to the main frame, and the track tread of the pilot wheel being removed from the pivotal center; resilient means for keeping the pilot frame in normal position aligned with the main frame, said pivoting embodying a horizontal longitudinal pivot on the main frame, a member mounted thereon to tilt about the horizontal longitudinal axis, and a normally vertical pivot carried by said member and on which the pilot frame is carried; so that the pilot frame and its wheel have tilting movement about the longitudinal axis and also have swinging movement in a plane normal to the vertical axis, but which plane tilts as the pilot frame tilts about the longitudinal axis.

9. A truck for mono-rail-system, embodying a main truck frame with wheel support, a pilot truck frame with a pilot wheel, said pilot frame being pivoted at its end to the main frame, said pivoting embodying a horizontal longitudinal pivot on the main frame, a member mounted thereon to tilt about the horizontal longitudinal axis, and a normally vertical pivot carried by said member and on which the pilot frame is carried; so that the pilot frame and its wheel have tilting movement about the longitudinal axis and also have swinging movement in a plane normal to the vertical axis, but which plane tilts as the pilot frame tilts about the longitudinal axis; and resilient means opposing the tilting of the pilot frame about the longitudinal pivot and tending to keep it and its pilot wheel normally upright.

10. A truck for mono-rail systems, embodying a main truck frame with wheel support, a pilot truck frame with a pilot wheel, said pilot frame being pivoted at its end to the main frame, and the track tread of the pilot wheel being removed from the pivotal center; resilient means for keeping the pilot frame in normal position aligned with the main frame, said pivoting embodying a horizontal longitudinal pivot on the main frame, a member mounted thereon to tilt about the horizontal longitudinal axis, and a normally vertical pivot carried by said member and on which the pilot frame is carried; so that the pilot frame and its wheel have tilting movement about the longitudinal axis and also have swinging movement in a plane normal to the vertical axis, but which plane tilts as the pilot frame tilts about the longitudinal axis the pilot wheel being longitudinally removed from the vertical pivot and the axis of the longitudinal pivot being substantially above the track tread of the pilot wheel.

11. A truck for mono-rail systems, embodying a main truck frame with wheel support, a pilot truck frame with a pilot wheel, said pilot frame being pivoted at its end to the main frame, and the track tread of the pilot wheel being removed from the pivotal center; resilient means for keeping the pilot frame in normal position aligned with the main frame, said pivoting embodying a horizontal longitudinal pivot on the main frame, a member mounted thereon to tilt about the horizontal longitudinal axis, and a normally vertical pivot carried by said member and on which the pilot frame is carried; so that the pilot frame and its wheel have tilting movement about the longitudinal axis and also have swinging movement in a plane normal to the vertical axis, but which plane tilts as the pilot frame tilts about the longitudinal axis; and resilient means opposing the tilting of the pilot frame about the longitudinal pivot and tending to keep it and its pilot wheel normally upright.

12. A truck, embodying a central truck frame with a wheel adapted to travel upon a rail, driving means for the wheel carried by the central truck frame, a pair of pilot truck frames one at each end of the central frame, each pilot frame being pivoted at its end to an end of the central frame on a longitudinal horizontal pivot and on a normally vertical pivot, each pilot frame having a pilot wheel at its free end removed longitudinally from the vertical pivot, and the longitudinal pivot being substantially above the track tread of the pilot wheel; and resilient means opposing movement of each pilot frame about its longitudinal pivot and tending to keep the pilot frames and wheels in alignment with each other and with the central frame and its wheel.

13. A truck for mono-rail systems, embodying a central truck frame with a wheel adapted to travel upon a rail, driving means for the wheel carried by the central truck frame, a pair of pilot truck frames one at each end of the central frame, each pilot frame being pivoted to the central frame to tilt on a longitudinal horizontal axis and to swing about a normally vertical axis, said pivoting embodying a longitudinal horizontal pivot on the central frame, a member carried thereby to tilt thereon, and a normally vertical transverse pivot carried by said member and carrying the pilot frame; so that the pilot frame may tilt about the longitudinal pivot and also swing in a plane normal to the transverse pivot, which plane is normally horizontal but tilts from that position as the pilot frame tilts about the longitudinal axis; each pilot frame having a pilot wheel at its free end removed longitudinally from the vertical pivot, and the longitudinal pivot being substantially above the track tread of the pilot wheel; and resilient means opposing movement of each pilot frame about its longitudinal pivot and tending to keep the pilot frames and wheels in alignment with each other and with the central frame and its wheel.

14. A truck embodying, a main frame with wheel support, a pilot frame with wheel support, and a single means connecting the frames and transmitting load thrust from the main frame to the pilot frame, said means embodying a connecting member, a pivotal connection between the main frame and said member allowing them relative movement about an axis longitudinal of the truck, and a pivotal connection between said member and the pilot frame allowing them pivotal movement only about a normally vertical axis.

15. A truck for mono-rail systems embodying a main truck frame with single wheel support, and a pilot frame with single wheel support connected at one end to the main frame so that the wheels are normally in a single longitudinal line and to be transversely movable relative to the main frame the connection between the main and the pilot frame normally keeping the frames in vertical alinement.

16. A truck for mono-rail systems embodying a main truck frame with single wheel support, a pilot frame with single wheel support at one end of the main frame and connected to the main frame to swing about a vertical axis and to keep the wheel thereof in vertical alinement, the frames normally carrying the wheels in a single longitudinal line.

17. A truck embodying a main truck frame with wheel support, a pilot frame, connecting means between the frames allowing them relative transverse movement, and yielding means at the connection between the frames allowing the frames relative twisting movement.

18. A truck embodying a main truck frame with wheel support, a pilot frame, connecting means between the frames allowing them relative transverse swinging movement, and yielding means at the connection between the frames allowing the frames relative twisting movement.

19. A truck embodying a main truck frame with wheel support, a pilot frame at one end of the main frame, and means connecting the main frame and the pilot frame to allow relative twisting movement between the main frame and the pilot frame and embodying means to yieldingly oppose such movement.

20. A truck embodying a main truck frame with wheel support, a pilot frame at each end of the main frame, means connecting the pilot frames to the main frame to allow them relative twisting movement and embodying resilient means to oppose such movement.

21. A truck embodying a main truck frame with wheel support, a pilot frame with wheel support at one end of the main frame, and means connecting the main frame and the pilot frame to transmit load thrust from the main frame to the pilot frame, to allow relative twisting movement between the main frame and the pilot frame, and to resiliently resist such twisting movement.

22. A truck embodying a main truck frame with wheel support, a pilot frame with wheel support at one end of the main frame, and means connecting the main frame and the pilot frame to transmit load thrust from the main frame to the pilot frame, to allow relative transverse movement between the main frame and the pilot frame, to allow relative twisting movement between the main frame and the pilot frame, and to resiliently resist such twisting movement.

23. A truck embodying a main frame with a wheel support, and a pilot frame with wheel support connected to the main frame to be movable relative thereto only about a vertical axis and a horizontal axis disposed longitudinally of the truck.

24. A truck embodying a main frame, a pilot frame, and means connecting the main frame and the pilot frame to transmit load thrust between the frames and to allow relative movement between the frames only about a vertical axis and about a horizontal axis disposed longitudinally of the truck.

25. A truck embodying a main frame with wheel support, a pilot frame with wheel support and connected to the main frame to swing relative thereto about an axis longitudinal of the truck and about a normally vertical axis, and means yieldingly resisting the first mentioned movement, said means embodying an arm movable with one of the frames, and a spring arranged between the arm and a part of the other frame.

26. A truck embodying a main frame with wheel support, a pilot frame with wheel support and connected to the main frame to swing relative thereto about an axis longitudinal of the truck and about a normally vertical axis, and means yieldingly resisting the first mentioned movement, said means embodying an arm movable with one of the frames and arranged transversely of said normally vertical axis and with its end parts at opposite sides of said normally vertical axis, and springs arranged between the end parts of the arm and parts carried by the other frame.

In witness that I claim the foregoing I have hereunto subscribed my name this 10th day of June 1919.

LEWIS A. FRYE.

Witness:
VIRGINIA I. BERINGER.